United States Patent
Tallam

(10) Patent No.: US 7,933,108 B2
(45) Date of Patent: Apr. 26, 2011

(54) MOTOR DRIVE WITH LOW LEAKAGE SURGE PROTECTION

(75) Inventor: Rangarajan M. Tallam, Germantown, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 635 days.

(21) Appl. No.: 11/959,046

(22) Filed: Dec. 18, 2007

(65) Prior Publication Data

US 2009/0154034 A1 Jun. 18, 2009

(51) Int. Cl.
*H02H 1/00* (2006.01)

(52) U.S. Cl. ......................................... 361/117; 361/120

(58) Field of Classification Search .......... 361/117–120, 361/127
See application file for complete search history.

(56) References Cited

U.S. PATENT DOCUMENTS

| | | | | |
|---|---|---|---|---|
| 3,894,274 A | * | 7/1975 | Rosenberry, Jr. | 361/23 |
| 4,035,693 A | | 7/1977 | Luxa et al. | |
| 4,455,586 A | * | 6/1984 | McCartney | 361/56 |
| 4,843,533 A | * | 6/1989 | Roof et al. | 363/55 |
| 5,157,572 A | * | 10/1992 | Bird | 361/56 |
| 6,069,781 A | * | 5/2000 | Wingate et al. | 361/111 |
| 6,226,162 B1 | | 5/2001 | Kladar et al. | |
| 6,226,166 B1 | | 5/2001 | Gumley et al. | |
| 6,765,777 B2 | | 7/2004 | Cantagrel | |
| 6,853,529 B2 | | 2/2005 | Kouwenhoven et al. | |

* cited by examiner

*Primary Examiner* — Danny Nguyen

(74) *Attorney, Agent, or Firm* — Boyle Fredrickson LLP; Alexander R. Kuszewski; John M. Miller

(57) ABSTRACT

A motor drive employs a combination of gas discharge tubes and metal oxide varistors to create precisely tailored surge protection that has a low leakage current minimizing the triggering of ground fault detection circuitry when multiple motor drives are attached to a single line source.

10 Claims, 2 Drawing Sheets

MOTOR DRIVE WITH LOW LEAKAGE SURGE PROTECTION

STATEMENT REGARDING FEDERALLY SPONSORED RESEARCH OR DEVELOPMENT

--

CROSS REFERENCE TO RELATED APPLICATION

--

BACKGROUND OF THE INVENTION

The present invention relates to motor drives for electric motors and in particular to a surge protection circuit reducing erroneous false ground fault indications and providing improved component life.

Motor drives control the frequency and amplitude of the electrical power applied to an electrical motor to improve motor operation, for example, by improving motor starting and stopping, motor speed and torque control, motor synchronization, load management, and energy efficiency. For this purpose, the motor drive will typically receive three-phase line power and rectify it to produce a DC bus voltage. The DC bus voltage is then received by a set of switching semiconductor devices, typically operating in switching mode, to synthesize multiphase AC electrical power from the DC bus voltage. The frequency and amplitude of the synthesized power is controlled by controlling the switching of the semiconductor devices.

In order to comply with the standards of regulatory and certification agencies, motor drives must have over-voltage or "surge" protection on their connections to line power to protect the motor drive and its associated equipment from high voltage transients induced, for example, by lightning or the switching of inductive loads elsewhere on the line. The surge protection device of choice is a metal-oxide-varistor (MOV). As is understood in the art, an MOV provides a nonlinear resistor having a high resistance up to a threshold voltage at which point the resistance drops to provide for a substantially constant voltage regulation up to the power limits of the MOV device. MOV devices are typically constructed of sintered zinc-oxide with other metal oxide additives.

A set of MOVs may be used to provide a network protecting the motor drive from excessive voltages between any of the three phase line inputs ("line-to-line over voltage") and between any of the line inputs and ground ("line-to-ground over voltage").

One problem with MOV is that a small amount of current ("leakage current") flows through these devices even when they are operating below their threshold voltage at normal line voltages. This leakage current, if flowing to ground, can trigger ground fault sensors used for fault detection particularly when several motor drives are connected to the same line inputs.

Further, the leakage current to the MOV degrades the MOV over time thus reducing its reliability.

SUMMARY OF THE INVENTION

The present invention provides a surge protection device utilizing a set of MOVs arranged in a network and combined with at least one gas discharge tube (GDT) in series with a network interconnection to ground. The gas discharge tube provides an essentially infinite resistance at voltages under its breakdown voltage thus ensuring very low current leakage to ground during normal operating conditions. At least one MOV is placed in series with the GDT preventing damaging current flows through the GDT when breakdown voltages are reached.

Specifically then the present invention provides a motor drive with integrated surge protection, the motor drive having three-phase power line inputs receiving AC power and a rectifier unit communicating with the power line inputs and converting the AC power to a DC bus voltage. An inverter receives the DC bus voltage to synthesize a motor drive current. A surge protection network provides an interconnection between each line input and ground and an interconnection between each line input and each other line input, the surge protection network controlling a maximum surge voltage across each interconnection. The surge protection network provides a metal oxide varistor on each interconnection and at least one gas discharge tube between each line input and ground.

It is thus one object of one embodiment of the invention to provide a surge protection device for motor drives that provides extremely low current leakage and thus that does not trigger ground fault detection devices when multiple motor drives are combined on a monitored power line.

The invention may provide one gas discharge tube between each line input and each other line input.

It is thus another object of one embodiment of the invention to provide low current leakage between line inputs such as may decrease the degradation of the MOV devices.

The interconnection between input lines may be a Wye interconnection.

It is thus another object of one embodiment of the invention to provide a surge protection network providing a neutral point.

In one embodiment the motor drive may have a first series connected MOV and GDT interconnecting a first line input and a common point; a second series connected MOV and GDT interconnecting a second line input and the common point; a third series connected MOV and GDT interconnecting a third line input and the common point; and an MOV interconnecting the common point to ground.

It is thus an object of one embodiment of the invention to provide for the leakage on line-to-line and line-to-ground pads while minimizing the number of GDTs.

The interconnection between input lines may be a Delta interconnection.

It is thus one object of one embodiment of the invention to provide a network where a common neutral point is not required.

The motor drive may include a first series connected MOV and GDT interconnecting a first line input and a second line input; a second series connected MOV and GDT interconnecting a second line input and a third line input; a third series connected MOV and GDT interconnecting a third line input and the first line input; a fourth series connected MOV and GDT interconnecting the first line input and ground; a fifth series connected MOV and GDT interconnecting the second line input and ground; and a sixth series connected MOV and GDT interconnecting the third line input and ground.

It is thus another object of one embodiment of the invention to provide for both line-to-line and line-to-ground low leakage in a Delta configuration Alternatively the motor drive may provide a first MOV interconnecting a first line input and a second line input; a second MOV interconnecting a second line input and a third line input; a third MOV interconnecting a third line input and the first line input; a fourth series connected MOV and GDT interconnecting the first line input and ground; a fifth series connected MOV and GDT interconnecting the second line input and ground; and a sixth series connected MOV and GDT interconnecting the third line input and ground.

It is thus an object of one embodiment of the invention to provide a Delta connection system with reduced GDTs.

The motor drive may provide only one gas discharge tube between ground and a common connection leading to each of the line inputs.

It is thus an object of one embodiment of the invention to provide an embodiment requiring only a single GDT.

The motor drive may provide a first MOV interconnecting a first line input and a common point; a second MOV interconnecting a second line input and the common point; a third MOV interconnecting a third line input and the common point; and a series connected MOV and GDT connecting the common point to ground.

It is thus another object of one embodiment of the invention to produce a cost minimized protection network.

The MOVs and GDT are rated for breakdown voltage greater than the peak value of the AC input line voltage.

It is thus an object of one embodiment of the invention to substantially increase the life of MOV in high voltage applications.

These particular features and advantages may apply to only some embodiments falling within the claims and thus do not define the scope of the invention.

DETAILED DESCRIPTION OF THE PREFERRED EMBODIMENT

Figure 1:
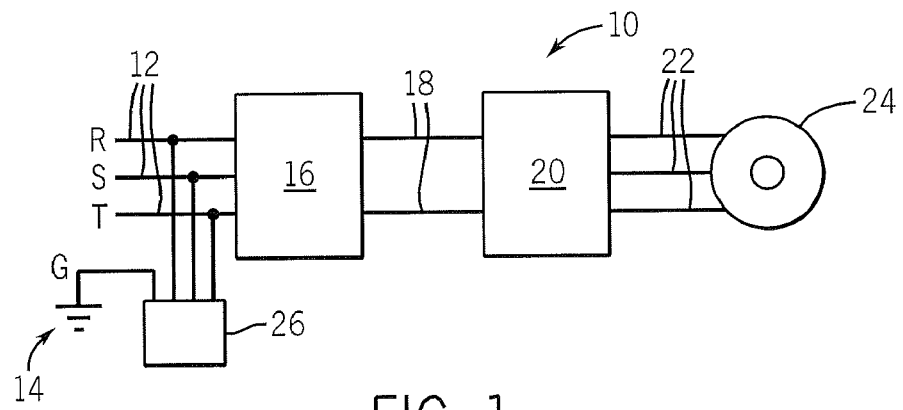
FIG. 1 is a simplified schematic representation of a standard motor drive using the present invention and showing ground and the multiple line inputs.

Referring now to FIG. 1, a solid-state motor drive 10 may receive three-phase power at line inputs 12 having phases labeled: R, S, and T, the line inputs providing three-phase power with respect to a ground 14 (labeled G).

The three-phase power at the line inputs 12 may be received by a rectifier circuit 16 producing a DC voltage on DC bus 18 as is understood in the art. The DC voltage may be received by inverter 20 which synthesizes new three-phase power 22 provided to a motor 24. By converting the three-phase power to DC and then back into three-phase power 22, the frequency, amplitude, and phase of the motor voltages and currents may be adjusted for precise motor control.

Generally, the three-phase power at line inputs 12 may have voltage surges caused by disturbances on the powerline including, for example, lightning. Accordingly a surge protector network 26 may be attached to the line inputs to suppress these transient voltages.

Figure 2:
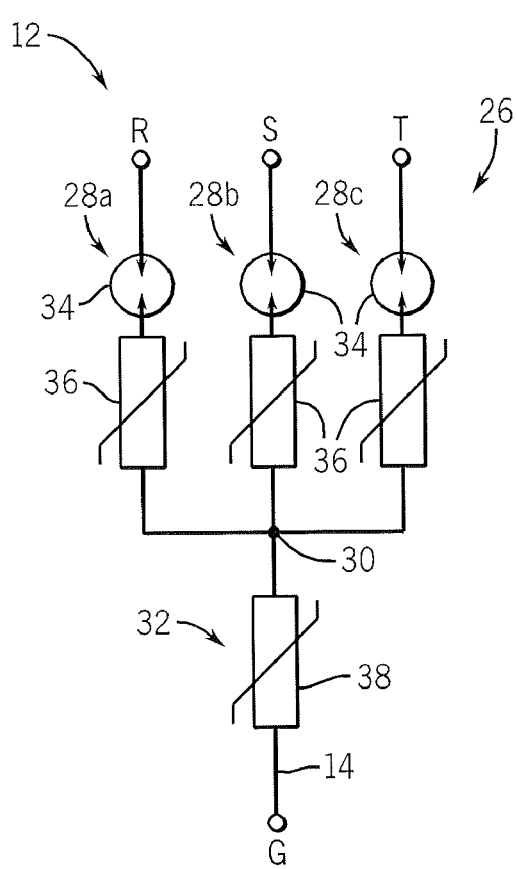
FIG. 2 is a schematic representation of a first embodiment of the invention employing a Wye connection and providing low line-to-line leakage and low leakage to ground.

Referring now to FIG. 2 in a first embodiment the surge protector network 26 may provide for three interconnections 28a, 28b, and 28c, each interconnection 28 passing between a single one of the line inputs 12 (R, S, T) and a neutral point 30 in a so-called Wye connection. A fourth interconnection 32 passes from the neutral point 30 to ground 14.

Each of the interconnections 28a-c provides a series connected gas discharge tube (GDT) 34 and MOV 36 each having substantially equal breakdown voltage. The order of the GDT 34 and MOV 36 in the series connection is not important. The fourth interconnection 32 may provide series conduction through a single MOV 38.

As is understood in the art, a GDT 34 is a crowbar type surge protection device that operates on the principle of arc discharge. GDTs are hermetically sealed capsules containing a rare earth gas, such as argon or neon, at a predetermined optimum pressure to create a controlled arc between two opposed electrodes at a given breakdown voltage. The electrodes may include ignition aids on their surface to ensure quick response to rapidly rising surge voltages. At voltages less than the breakdown voltage, virtually no current flows through the GDT 34. At voltages above the breakdown voltage, current flows and voltages across the GDT 34 are clamped at a low value of approximately 10 to 25 V.

The GDTs 34 and MOV 36 each have a breakdown voltage defined by one half of the maximum desired voltage limit between any two line inputs 12. Thus, for example, if it is desired to limit the maximum line-to-line surge voltages to 550 V, then each GDT 34 and MOV 36 will have a breakdown voltage of approximately 275 V. The maximum line-to-ground breakdown voltage may be the same or different by using an MOV 38 with a different breakdown voltage as desired.

In this configuration, any path between any of the line inputs 12 to another line inputs 12, or between any of the line inputs 12 and the ground 14 must pass through a GDT 34. Therefore each of the interconnections 28a-c and 32 experiences extremely low current leakage, resulting in extremely low line-to-line current leakage and line-to-ground current leakage.

Figure 3:
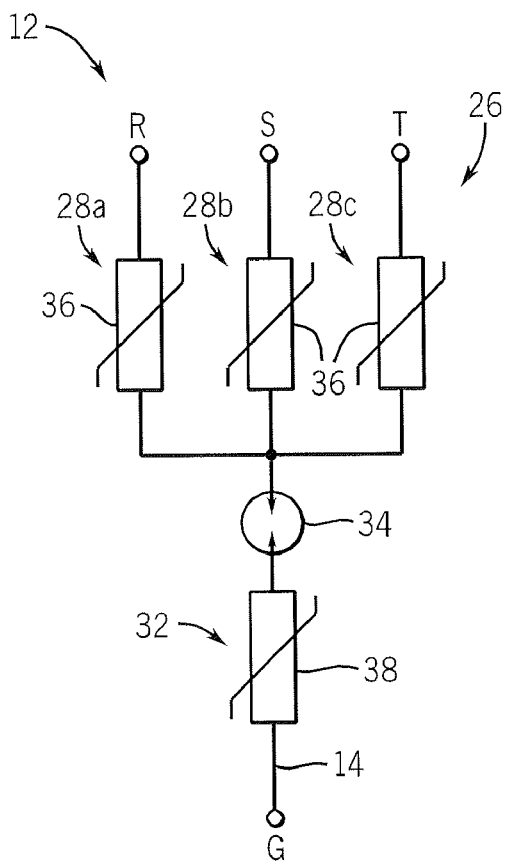
FIG. 3 is a schematic representation of a second embodiment of the invention minimizing the use of gas discharge tubes.

Referring now to FIG. 3, in an alternative embodiment, the multiple GDTs 34 may be removed in favor of a single GDT 34 placed in series with MOV 38 on interconnection 32. Interconnection 28a, 28b and 28c, in this case, provide only the MOV 36 without accompanying GDTs. This configuration provides some leakage currents along interconnections 28a-c, and thus some line-to-line leakage current; however, leakage current along interconnections 32 is blocked providing low line-to-ground leakage current. This embodiment further significantly reduces the number of GDTs and thus the cost of the surge protector network 26.

Figure 4:
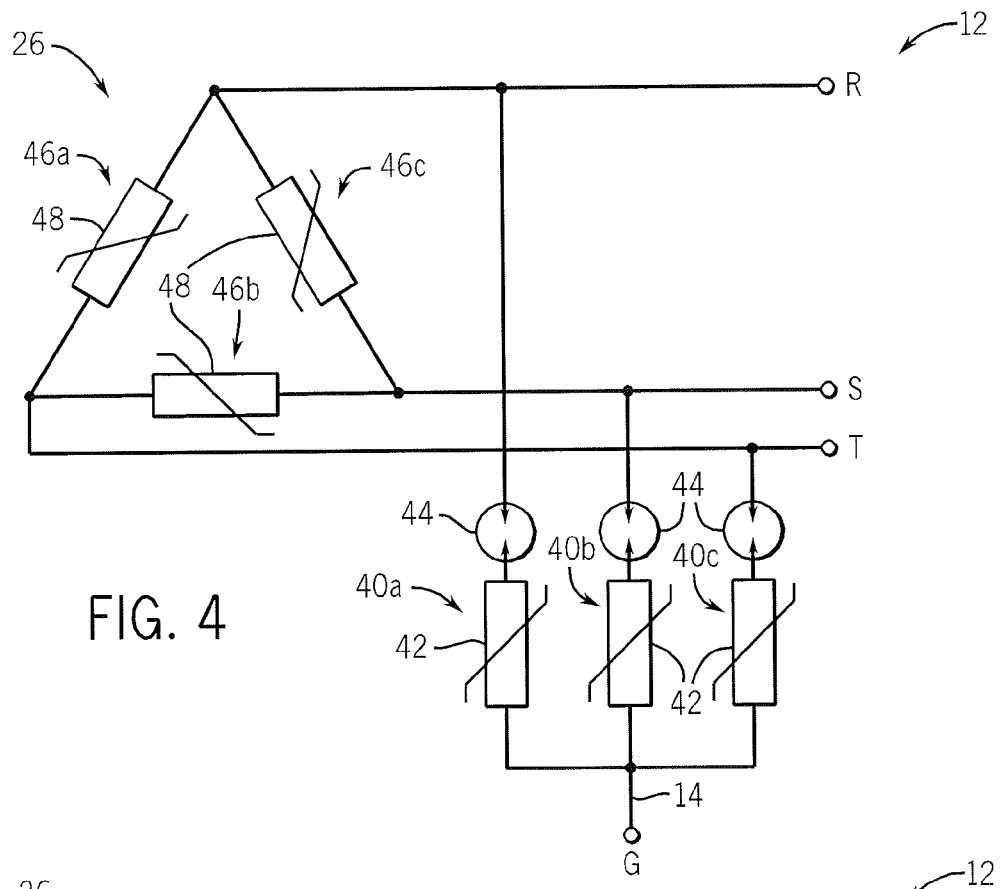
FIG. 4 is a schematic representation of a third embodiment of the invention employing a Delta connection.

Referring now to FIG. 4, in an alternative embodiment, three interconnections 40a, 40b, and 40c may join the ground 14 to one of the line inputs 12 (R, S, T) associated with each of the interconnections 40a-c. In this case each interconnection 40a-c provides a series connected MOV 42 and GDT 44. Again, the order of the MOV 42 and GDT 44 in the series connection is not important.

In this embodiment, three more interconnections 46a, 46b and 46c may each join one of the line inputs 12 to one other line input 12 in a so-called Delta connection. In this case each interconnection 46 consists of a single MOV 48. This topology provides essentially the same protection as that provided by the embodiment of FIG. 3, permitting some line-to-line leakage current but blocking line-to-ground leakage current by means of GDTs 44. In this embodiment the maximum surge voltage between line inputs 12 (line-to-line surge voltage) may be selected independently of the maximum surge voltage between line inputs 12 and ground 14 (line-to-ground and surge voltage) with the former being either higher or lower than the latter. Further, failure one of the MOVs 48 does not compromise surge protection with respect to ground, as would be the case for the embodiment of FIG. 3.

Figure 5:
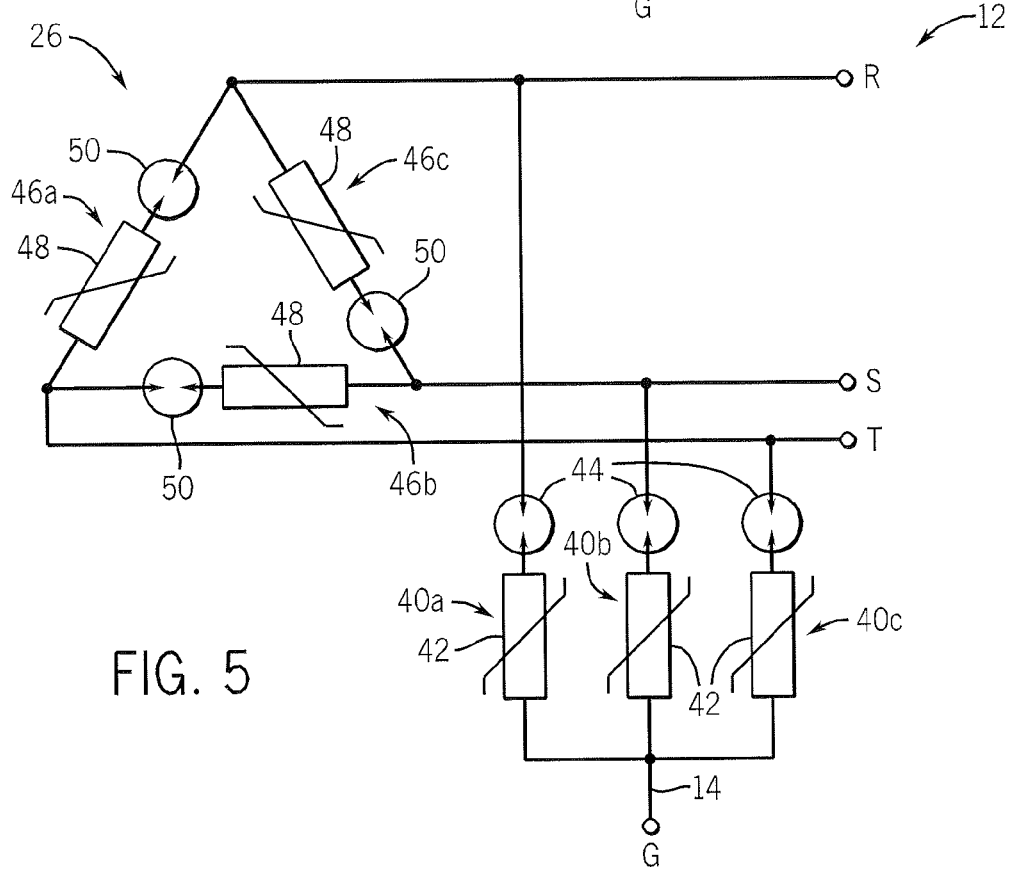
FIG. 5 is figure of a fourth embodiment of the invention employing a Delta connection and providing reduced line-to-line leakage.

Referring now to FIG. 5, low line-to-line leakage current may be provided between the line inputs 12 by using the circuit of FIG. 4 and replacing the single MOV 48 in each of the interconnections 46*a-c* with a series connected MOV 48 and GDT 50. Again, the order of the GDT 50 and the MOV 48 in the series connection is arbitrary.

It is specifically intended that the present invention not be limited to the embodiments and illustrations contained herein, but include modified forms of those embodiments including portions of the embodiments and combinations of elements of different embodiments as come within the scope of the following claims.

I claim:

1. A motor drive with integrated surge protection comprising:
   a three-phase power line input receiving AC power;
   a rectifier unit communicating with the power line input and converting the AC power to a DC bus voltage;
   an inverter receiving the DC bus voltage to synthesize a motor drive current and from the DC bus voltage; and
   a surge protection network further comprising:
   a first series connected MOV and GDT interconnecting a first line input and a common point;
   a second series connected MOV and GDT interconnecting a second line input and the common point;
   a third series connected MOV and GDT interconnecting a third line input and the common point; and
   an MOV interconnecting the common point to ground.

2. A motor drive with integrated surge protection comprising:
   a three-phase power line input receiving AC power;
   a rectifier unit communicating with the power line input and converting the AC power to a DC bus voltage;
   an inverter receiving the DC bus voltage to synthesize a motor drive current and from the DC bus voltage; and
   a surge protection network further comprising:
   a first MOV interconnecting a first dine input and a second line input;
   a second MOV interconnecting a second line input and a third line input;
   a third MOV interconnecting a third line input and the first line input;
   a fourth MOV connected in series with a first GDT interconnecting the first line input and ground;
   a fifth MOV connected in series with a second GDT interconnecting the second line input and ground; and
   a sixth MOV connected in series with a third GDT interconnecting the third line input and ground.

3. The motor drive of claim 2 further comprising:
   a fourth GDT connected in series with the first MOV between the first line input and the second line input;
   a fifth GDT connected in series with the second MOV between the second line input and the third line input; and
   a sixth GDT connected in series with the third MOV between the third line input and the first line input.

4. A motor drive with integrated surge protection comprising:
   a three-phase power line input receiving AC power;
   a rectifier unit communicating with the power line input and converting the AC power to a DC bus voltage;
   an inverter receiving the DC bus voltage to synthesize a motor drive current and from the DC bus voltage; and
   a surge protection network further comprising:
   a first MOV interconnecting a first line input and a common point;
   a second MOV interconnecting a second line input and the common point;
   a third MOV interconnecting a third line input and the common point; and
   a series connected MOV and GDT connecting the common point to ground.

5. The motor drive of claim 4 wherein each of the MOVs and the GDT are rated for breakdown voltage greater than the peak value of the AC input line voltage.

6. A method of: providing electrical protection to a motor drive of a type connected to a three-phase power line input to receive AC power at a rectifier unit communicating with the power line input and converting the AC power to a DC bus voltage, and further having an inverter receiving the DC bus voltage to synthesize a motor drive current from the DC bus voltage, the method comprising the steps of:
   interconnecting a first line input and a common point with a first series connected MOV and GDT;
   interconnecting a second line input and the common point with a second series connected MOV and GDT;
   interconnecting a third line input and the common point with a third series connected MOV and GDT; and
   interconnecting the common point to ground with a MOV.

7. A method of: providing electrical protection to a motor drive of a type connected to a three-phase power line input to receive AC power at a rectifier unit communicating with the power line input and converting the AC power to a DC bus voltage, and further having an inverter receiving the DC bus voltage to synthesize a motor drive current from the DC bus voltage, the method comprising the steps of:
   interconnecting a first line input and a second line input with a first MOV;
   interconnecting a second line input and a third line input with a second MOV;
   interconnecting a third line input and the first line input with a third MOV;
   interconnecting the first line input and ground with a fourth MOV connected in series with a first GDT;
   interconnecting the second line input and ground with a fifth MOV connected in series with a second GDT; and
   interconnecting the third line input and ground with a sixth MOV connected in series with a third GDT.

8. The method of claim 7 further comprising the steps of:
   interconnecting a fourth GDT in series with the first MOV between the first line input and the second line input;
   interconnecting a fifth GDT in series with the second MOV between the second line input and the third line input; and
   interconnecting a sixth GDT in series with the third MOV between the third line input and the first line input.

9. A method of: providing electrical protection to a motor drive of a type connected to a three-phase power line input to receive AC power at a rectifier unit communicating with the power line input and converting the AC power to a DC bus voltage, and further having an inverter receiving the DC bus voltage to synthesize a motor drive current from the DC bus voltage, the method comprising the steps of:
   interconnecting a first line input and a common point with a first MOV;

interconnecting a second line input and the common point with a second MOV;
interconnecting a third line input and the common point with a third MOV; and
connecting the common point to ground with a fourth MOV connected in series with a GDT.

10. The method of claim 9 wherein the each of the MOVs and the GDT are rated for breakdown voltage greater than the peak value of the AC input line voltage.

* * * * *